United States Patent
Konishi et al.

(10) Patent No.: US 10,927,496 B2
(45) Date of Patent: *Feb. 23, 2021

(54) METHOD FOR RECOVERING PULP FIBERS FROM USED ABSORBENT ARTICLE

(71) Applicant: UNICHARM CORPORATION, Ehime (JP)

(72) Inventors: Takayoshi Konishi, Kagawa (JP); Toshio Hiraoka, Kagawa (JP); Koichi Yamaki, Kagawa (JP); Noritomo Kameda, Kagawa (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/321,829

(22) PCT Filed: Jun. 9, 2017

(86) PCT No.: PCT/JP2017/021541
§ 371 (c)(1),
(2) Date: Jan. 30, 2019

(87) PCT Pub. No.: WO2018/025501
PCT Pub. Date: Feb. 8, 2018

(65) Prior Publication Data
US 2019/0169795 A1  Jun. 6, 2019

(30) Foreign Application Priority Data

Aug. 5, 2016 (JP) ............................... JP2016-154974

(51) Int. Cl.

| | | |
|---|---|---|
| *D21C 5/02* | (2006.01) | |
| *D21B 1/02* | (2006.01) | |
| *B09B 3/00* | (2006.01) | |
| *B29B 17/02* | (2006.01) | |
| *C08J 11/06* | (2006.01) | |
| *C08J 11/16* | (2006.01) | |
| *B09B 5/00* | (2006.01) | |
| *C08J 11/04* | (2006.01) | |
| *B29L 31/48* | (2006.01) | |

(52) U.S. Cl.
CPC ............... *D21C 5/022* (2013.01); *B09B 3/00* (2013.01); *B09B 3/0075* (2013.01); *B09B 3/0083* (2013.01); *B09B 5/00* (2013.01); *B29B 17/02* (2013.01); *C08J 11/04* (2013.01); *C08J 11/06* (2013.01); *C08J 11/16* (2013.01); *D21B 1/021* (2013.01); *D21B 1/026* (2013.01); *D21C 5/02* (2013.01); *B29L 2031/4878* (2013.01); *C08J 2300/14* (2013.01); *Y02E 50/30* (2013.01); *Y02W 30/62* (2015.05); *Y02W 30/64* (2015.05)

(58) Field of Classification Search
CPC .................................. D21C 5/02; D21C 5/022
See application file for complete search history.

(56) References Cited

U.S. PATENT DOCUMENTS

| | | | | |
|---|---|---|---|---|
| 5,558,745 A | * | 9/1996 | Conway | ................. B29B 17/02 134/26 |
| 2010/0065233 A1 | * | 3/2010 | Pipon | ..................... D21C 9/153 162/65 |
| 2016/0237617 A1 | | 8/2016 | Yamaguchi et al. | |
| 2017/0107667 A1 | | 4/2017 | Konishi et al. | |

FOREIGN PATENT DOCUMENTS

| | | |
|---|---|---|
| EP | 3238840 A1 | 11/2017 |
| JP | H4-317785 A | 11/1992 |
| JP | 2003-39023 A | 2/2003 |
| JP | 2003-225645 A | 8/2003 |
| JP | 2010-84031 A | 4/2010 |
| JP | 2012-66156 A | 4/2012 |
| JP | 2014-217835 A | 11/2014 |
| JP | 2016-123973 A | 7/2016 |
| WO | 2014/168179 A1 | 10/2014 |
| WO | 2015/064209 A1 | 5/2015 |
| WO | 2015/190140 A1 | 12/2015 |

OTHER PUBLICATIONS

English Machine Translation of WO 2014168179, translated on Feb. 19, 20120. (Year: 2020).*

* cited by examiner

*Primary Examiner* — Anthony Calandra
(74) *Attorney, Agent, or Firm* — Hauptman Ham, LLP

(57) ABSTRACT

A method is provided for recovering pulp fibers having little damage from a used absorbent article that contains pulp fibers and a superabsorbent polymer. The used absorbent article is treated at a temperature of greater than or equal to 80° C. with an organic acid aqueous solution having a pH no greater than 2.5, and the superabsorbent polymer is deactivated. Preferably, the pulp fibers and the deactivated superabsorbent polymer are separated from the used absorbent article after treatment with the organic acid aqueous solution, and further, a mixture including the separated pulp fibers and deactivated superabsorbent polymer is treated with an oxidizing agent, the deactivated superabsorbent polymer is decomposed, reduced in molecular weight and solubilized.

7 Claims, No Drawings

METHOD FOR RECOVERING PULP FIBERS FROM USED ABSORBENT ARTICLE

RELATED APPLICATIONS

The present application is a National Phase of International Application Number PCT/JP2017/021541, filed on Jun. 9, 2017, and claims priority to Japanese Application Number 2016-154974, filed on Aug. 5, 2016.

FIELD

The present invention relates to a method for recovering pulp fibers from a used absorbent article. More specifically, it relates to a method for recovering pulp fibers from a used absorbent article that contains pulp fibers and a superabsorbent polymer, with minimal damage.

BACKGROUND

It has been attempted to recycle used absorbent articles such as disposable paper diapers. For recycling of used absorbent articles, it is common to disintegrate the used absorbent articles in water, separating them into the constituent components of the absorbent articles, which are then recovered. However, the superabsorbent polymers that are included in absorbent articles absorb moisture and increase in mass, while also gelling and losing their flow property, causing the throughput capacity of the treatment apparatus to be reduced.

In this regard, Japanese Unexamined Patent Publication No. 2010-84031 proposes a method of treating used paper diapers wherein lime, a hypochlorite and used paper diapers are loaded into a treatment tank and stirred for a prescribed period while supplying water in the minimum amount necessary for stirring in the treatment tank, the liquid in the treatment tank is discharged out of the treatment tank while dewatering, and the discharged waste water is recovered, subjected to water quality treatment and discarded.

CITATION LIST

Patent Literature

[PTL 1] Japanese Unexamined Patent Publication No. 2010-84031

SUMMARY

Technical Problem

In Japanese Unexamined Patent Publication No. 2010-84031, however, since lime is loaded in an amount sufficient for inactivation of the superabsorbent polymer, and a hypochlorite is used as a disinfectant (microbicide), the lime produces a highly alkaline environment inside the treatment tank, which not only causes degradation of the pulp fibers, but due to the presence of a large amount of superabsorbent polymer that has been crosslinked and dewatered by calcium ions in the lime, as well as undissolved lime, the ash content in the pulp fibers recovered by the treatment is extremely high, resulting in reduced performance and quality. Furthermore, the use of a hypochlorite raises concerns regarding effects on the environment.

Solution to Problem

The present inventors have focused on the aforementioned problems of the prior art, and have completed this invention upon finding that it is possible to recover pulp fibers with minimal damage by using an organic acid, which produces minimal damage to pulp fibers, as washing water, at a pH which allows the sterilizing effect to be drastically improved, and with heating at 80° C. or higher.

In other words, the present invention is a method for recovering pulp fibers from a used absorbent article containing pulp fibers and a superabsorbent polymer, wherein the method includes a step of treating the used absorbent article at a temperature of 80° C. or higher with an organic acid aqueous solution having a pH of no higher than 2.5, to inactivate the superabsorbent polymer.

The invention encompasses the following aspects.

[1] A method of recovering pulp fibers from a used absorbent article containing pulp fibers and a superabsorbent polymer, wherein the method includes a step of treating the used absorbent article at a temperature of 80° C. or higher with an organic acid aqueous solution having a pH of no higher than 2.5, to inactivate the superabsorbent polymer.

[2] The method according to [1], which further includes a step of separating the pulp fibers and the inactivated superabsorbent polymer from the used absorbent article that has been treated with the organic acid aqueous solution.

[3] The method according to [2], which further includes a step of treating a mixture comprising separated pulp fibers and an inactivated superabsorbent polymer with an oxidizing agent to decompose, reduce in molecular weight and solubilize the inactivated superabsorbent polymer.

[4] The method according to [3], which further includes a step of separating the pulp fibers from the mixture that has been treated with the oxidizing agent.

[5] The method according to any one of [1] to [4], wherein the organic acid is citric acid.

[6] The method according to [5], wherein the citric acid concentration in the organic acid aqueous solution is 2 mass % or greater.

[7] The method according to any one of [2] to [4], wherein the used absorbent article includes a material composed of a thermoplastic resin, and the method further includes a step of drying the residue obtained from separating the pulp fibers and the inactivated superabsorbent polymer from the used absorbent article, and separating the material composed of a thermoplastic resin from the dried residue.

[8] The method according to any one of [2] to [4], wherein the used absorbent article includes a thermoplastic resin film, and the method further includes a step of drying the residue obtained from separating the pulp fibers and the inactivated superabsorbent polymer from the used absorbent article, and separating the thermoplastic resin film from the dried residue.

[9] The method according to any one of [1] to [8], wherein the absorbent article is at least one type selected from the group consisting of paper diapers, urine-absorbing pads, bed sheets, sanitary napkins and pet sheets.

Advantageous Effects of Invention

According to the method of the invention it is possible to recover pulp fibers from a used absorbent article that contains pulp fibers and a superabsorbent polymer, with minimal damage.

DESCRIPTION OF EMBODIMENTS

The invention is a method for recovering pulp fibers from a used absorbent article that contains pulp fibers and a superabsorbent polymer.

The absorbent article is not particularly restricted so long as it contains pulp fibers and a superabsorbent polymer, and examples include paper diapers, urine-absorbing pads, bed sheets, sanitary napkins and pet sheets. Such absorbent articles are usually composed of constituent materials such as pulp fibers, a superabsorbent polymer, a nonwoven fabric, a thermoplastic resin film and a hot-melt adhesive.

There are no particular restrictions on the pulp fibers, and examples include fluffy pulp fibers and chemical pulp fibers.

A superabsorbent polymer, also known as SAP, has a three-dimensional network structure with an appropriately crosslinked water-soluble polymer, and therefore absorbs a few hundred to a few thousand times its weight in water while being essentially water-insoluble and preventing absorbed water from emerging even with some degree of pressure application, and examples thereof include starch-based, acrylic acid-based and amino acid-based particulate or fibrous polymers.

The method of the invention includes a step of treating a used absorbent article at a temperature of 80° C. or higher with an organic acid aqueous solution having a pH of no higher than 2.5, to inactivate the superabsorbent polymer (hereunder also referred to simply as "organic acid aqueous solution treatment step"). By treatment with an organic acid aqueous solution having a pH of no higher than 2.5, the Na ions of the superabsorbent polymer in the used absorbent article are replaced by H ions, allowing the water-absorbing capacity of the superabsorbent polymer to be notably reduced, and avoiding water-swelled expansion of the superabsorbent polymer during treatment which leads to reduced treatment efficiency. Moreover, with a temperature of 80° C. or higher, the hot-melt adhesive bonding the constituent materials of the absorbent article becomes softened and the adhesive force is reduced, thereby causing the adhesive to be easily detached by force during stirring and washing and allowing the absorbent article to disintegrate into its constituent materials. Furthermore, since an organic acid aqueous solution with a pH of no higher than 2.5 is used and heated to 80° C. or higher, virtually all of the microbes are killed. Since the method of the invention carries out treatment at a temperature of 80° C. or higher whereby the absorbent article is disintegrated into its constituent materials, there is no need to crush the used absorbent article or remove out the pulp fibers before the organic acid aqueous solution treatment step. That is, the organic acid aqueous solution treatment step can be carried out with the used absorbent article in its original state. According to the method of the invention it is possible for the pulp fibers, the superabsorbent polymer and other constituent materials to be released into the organic acid aqueous solution without being damaged by physical force, and to be efficiently contacted with the organic acid aqueous solution. In addition, since the constituent materials such as the nonwoven fabric and film can be recovered while maintaining their shapes, there is no need for a complex separating step, and the recovery efficiency is high.

Organic acids include citric acid, tartaric acid, glycolic acid, malic acid, succinic acid, acetic acid and ascorbic acid, with citric acid being particularly preferred. The chelating effect of citric acid traps metal ions and the like present in excreta, allowing their removal, and the washing effect of citric acid can potentially provide a high fouling component-removal effect.

The pH of the organic acid aqueous solution is no higher than 2.5, preferably 1.3 to 2.4 and more preferably 1.5 to 2.1. If the pH is too high, it may not be possible to sufficiently lower the water-absorbing capacity of the superabsorbent polymer. The sterilizing ability may also be reduced, and *Bacillus subtilis* and other microbes that form spores may not be adequately sterilized. If the pH is too low, the risk of corrosion of the equipment will increase, lowering its service life, and large amounts of alkaline chemicals may be necessary for neutralizing treatment during waste water treatment.

The pH varies depending on the water temperature, but the pH for the purpose of the invention is the pH measured at an aqueous solution temperature of 20° C.

The organic acid concentration of the organic acid aqueous solution is not restricted so long as the pH of the organic acid aqueous solution is no higher than 2.5, but when the organic acid is citric acid, the citric acid concentration is preferably 2 mass % or greater, more preferably 2.0 to 4.0 mass % and even more preferably 2.0 to 3.0 mass %. If the citric acid concentration is 2% or greater at 80° C. or higher, it will be possible to kill *Bacillus subtilis*, which is resistant to killing, by washing for 5 minutes or longer.

The organic acid aqueous solution may also contain a detergent or the like.

The treatment temperature, i.e. the temperature of the organic acid aqueous solution, is 80° C. or higher, preferably 85° C. or higher and lower than 100° C. and more preferably 85 to 95° C. If the temperature is too low, it will not be possible to adequately soften the hot-melt adhesive and the used absorbent article will not be able to disintegrate into its constituent materials. The sterilizing ability may also be reduced, and *Bacillus subtilis* and other microbes that form spores may not be adequately sterilized. If the temperature is too high, the treated water may boil, increasing the pressure inside the treatment tank and requiring a pressure-resistant tank, or odors from excreta may tend to diffuse, resulting in an impaired working environment.

The treatment time is not limited so long as the superabsorbent polymer can be inactivated and the used absorbent article can be disintegrated into its constituent materials, but it is preferably 5 to 60 minutes and more preferably 10 to 30 minutes.

The amount of organic acid aqueous solution is not limited so long as the superabsorbent polymer can be inactivated and the used absorbent article can be disintegrated into its constituent materials, but it is preferably 300 to 3000 parts by mass, more preferably 500 to 2500 parts by mass and even more preferably 1000 to 2000 parts by mass with respect to 100 parts by mass of the used absorbent article.

The method of treating the used absorbent article at a temperature of 80° C. or higher with an organic acid aqueous solution having a pH of no higher than 2.5 is not particularly restricted, and for example, a prescribed amount of used absorbent article is loaded into washing equipment, and then an organic acid aqueous solution with a pH of no higher than 2.5 that has been heated to 80° C. or higher is loaded in and agitation is carried out if necessary. A detergent or the like may also be added to the organic acid aqueous solution if necessary.

The method of the invention may further include a step of separating the pulp fibers and the inactivated superabsorbent polymer from the used absorbent article that has been treated with the organic acid aqueous solution (hereunder also referred to simply as "separating step"). The method of separating the pulp fibers and the inactivated superabsorbent polymer is not limited, and for example, the mixture produced by the organic acid aqueous solution treatment step may be discharged while being passed through a screen having preferably a mesh opening of 5 to 100 mm and more preferably a mesh opening of 10 to 80 mm, to separate the pulp fibers and the inactivated superabsorbent polymer into the drainage while leaving the other large-sized matter such as the nonwoven fabric and thermoplastic resin film on the screen.

The method of the invention may further include a step of treating the mixture comprising separated pulp fibers and an inactivated superabsorbent polymer with an oxidizing agent to decompose, reduce in molecular weight and solubilize the inactivated superabsorbent polymer (hereunder also referred to simply as "oxidizing agent treatment step"). By treating the mixture of the pulp fibers and the inactivated superabsorbent polymer with an oxidizing agent, it is possible to oxidatively decompose, reduce in molecular weight and solubilize the inactivated superabsorbent polymer while carrying out secondary sterilization, bleaching and deodorization of the pulp fibers. The decomposed, molecular weight-reduced and solubilized state of the superabsorbent polymer means a state in which it passes through a 2 mm screen. In other words, in this step, the superabsorbent polymer is decomposed until it passes through a screen with a mesh opening of 2 mm.

The oxidizing agent is not limited so long as it can decompose, reduce in molecular weight and solubilize the inactivated superabsorbent polymer, and examples include chlorine dioxide, ozone and sodium hypochlorite. Ozone is preferred among these from the viewpoint of high decomposing power, and effect on the environment.

The method of treatment with the oxidizing agent is not limited so long as it can decompose, reduce in molecular weight and solubilize the inactivated superabsorbent polymer, and for example, the oxidizing agent may be added to the drainage containing the pulp fibers and inactivated superabsorbent polymer, which is obtained after separation through the screen in the separating step. Alternatively, the drainage may be further passed through a fine screen that does not allow passage of the pulp fibers and inactivated superabsorbent polymer, thus separating the pulp fibers and inactivated superabsorbent polymer from the drainage, and the separated pulp fibers and inactivated superabsorbent polymer may be added to an aqueous solution of the oxidizing agent.

When ozone is used as the oxidizing agent, the oxidizing agent treatment may be carried out by contacting the mixture containing the pulp fibers and inactivated superabsorbent polymer with the ozone, or more specifically, the ozone may be blown into the drainage containing the pulp fibers and inactivated superabsorbent polymer. Ozone can be generated using, for example, an ozone water generator (such as an ED-OWX-2 ozone water exposure tester by EcoDesign, Inc. or an OS-25V ozone generator by Mitsubishi Electric Corp.).

When ozone is to be blown into drainage containing the pulp fibers and inactivated superabsorbent polymer, the ozone concentration in the drainage is not particularly restricted so long as it is a concentration allowing decomposition of the superabsorbent polymer, and it is preferably 1 to 50 ppm by mass, more preferably 2 to 40 ppm by mass and even more preferably 3 to 30 ppm by mass. If the concentration is too low it may not be possible to completely solubilize the superabsorbent polymer, potentially leading to residue of the superabsorbent polymer in the recovered pulp fibers. If the concentration is too high, conversely, the oxidizing power will increase, potentially damaging the pulp fibers and possibly causing problems in terms of safety.

The ozone treatment time is not particularly restricted so long as it is a time allowing the superabsorbent polymer to be decomposed. The treatment time may be short if the ozone concentration is high, but it must be a longer time if the ozone concentration is low.

The product of the ozone concentration (ppm) and the treatment time (min) (hereunder also referred to as "CT value") is preferably 100 to 6000 ppm·min, more preferably 200 to 4800 ppm·min and even more preferably 300 to 3600 ppm·min. If the CT value is too low it may not be possible to completely solubilize the superabsorbent polymer, potentially leading to residue of the superabsorbent polymer in the recovered pulp fibers. Conversely, an excessively large CT value may result in damage to the pulp fibers, reduced safety and increased manufacturing cost.

The treatment time will depend on the ozone concentration, as explained above, but it is preferably 20 to 120 minutes, more preferably 30 to 100 minutes and even more preferably 40 to 80 minutes.

The temperature during ozone treatment is not particularly restricted so long as it is a temperature allowing the superabsorbent polymer to be decomposed. When ozone is to be blown into drainage containing the pulp fibers and inactivated superabsorbent polymer, the drainage may be heated or at room temperature.

In the oxidizing agent treatment step, the superabsorbent polymer undergoes oxidative decomposition by the oxidizing agent and the three-dimensional network structure of the superabsorbent polymer collapses, the superabsorbent polymer losing its water retention and becoming reduced in molecular weight and solubilized.

When ozone is to be blown into drainage containing the pulp fibers and inactivated superabsorbent polymer, the drainage is preferably acidic. More preferably, the pH of the drainage is no higher than 2.5, and even more preferably 1.5 to 2.4. Treatment in an acidic state can improve the superabsorbent polymer decomposing and removal effect of the ozone, allowing the superabsorbent polymer to be decomposed in a shorter time.

When chlorine dioxide is used as the oxidizing agent, the oxidizing agent treatment may be carried out by contacting the mixture containing the pulp fibers and inactivated superabsorbent polymer with the chlorine dioxide, or more specifically, the chlorine dioxide may be blown into the drainage containing the pulp fibers and inactivated superabsorbent polymer. The chlorine dioxide used may be a commercially available product.

When chlorine dioxide is to be blown into drainage containing the pulp fibers and inactivated superabsorbent polymer, the chlorine dioxide concentration in the drainage is not particularly restricted so long as it is a concentration allowing decomposition of the superabsorbent polymer, and it is preferably 150 to 1100 ppm by mass, more preferably 200 to 1000 ppm by mass and even more preferably 300 to 900 ppm by mass. If the concentration is too low it may not be possible to completely solubilize the superabsorbent polymer, potentially leading to residue of the superabsorbent polymer in the recovered pulp fibers. If the concentration is too high, conversely, the oxidizing power will increase, potentially damaging the pulp fibers and possibly causing problems in terms of safety.

The treatment time is the same as for ozone treatment.

When sodium hypochlorite is used as the oxidizing agent, the oxidizing agent treatment may be carried out by contacting the mixture containing the pulp fibers and inactivated superabsorbent polymer with the sodium hypochlorite, or more specifically, the sodium hypochlorite may be added to the drainage containing the pulp fibers and inactivated superabsorbent polymer, or the pulp fibers and inactivated superabsorbent polymer separated from the drainage by a screen may be immersed in an aqueous solution of the sodium hypochlorite. The sodium hypochlorite used may be a commercially available product.

When sodium hypochlorite is to be added to drainage containing the pulp fibers and inactivated superabsorbent polymer, or when the pulp fibers and inactivated superabsorbent polymer are to be immersed in an aqueous solution of the sodium hypochlorite, the sodium hypochlorite concentration in the drainage or in the aqueous solution of the sodium hypochlorite is not particularly restricted so long as it is a concentration allowing decomposition of the superabsorbent polymer, but it is preferably 150 to 1000 ppm by mass, more preferably 200 to 800 ppm by mass and even more preferably 250 to 700 ppm by mass. If the concentration is too low it may not be possible to completely solubilize the superabsorbent polymer, potentially leading to residue of the superabsorbent polymer in the recovered pulp fibers. If the concentration is too high, conversely, the oxidizing power will increase, potentially damaging the pulp fibers and possibly causing problems in terms of safety.

The treatment time is the same as for ozone treatment.

The method of the invention may further include a step of separating the pulp fibers from a mixture treated by an oxidizing agent (hereunder also referred to simply as "pulp fiber separating step"). The method of separating the pulp fibers is not particularly restricted, and for example, the pulp fibers may be separated by passing the mixture that has been treated by the oxidizing agent through a screen with a mesh opening of 0.15 to 2 mm. If the mixture that has been treated by the oxidizing agent, and more specifically the drainage containing the pulp fibers and decomposed superabsorbent polymer, is passed through a screen with a mesh opening of 0.15 to 2 mm, the drainage containing the decomposed superabsorbent polymer will pass through the screen while the pulp fibers will remain on the screen.

The separated pulp fibers may be dewatered, dried and recovered as necessary.

The drying temperature for drying is preferably 105 to 210° C., more preferably 110 to 190° C. and even more preferably 120 to 180° C. The drying time will depend on the drying temperature, but it is preferably 10 to 120 minutes, more preferably 15 to 100 minutes and even more preferably 20 to 90 minutes.

When the used absorbent article includes a material composed of a thermoplastic resin, the method of the invention may further include a step of drying the residue obtained from separating the pulp fibers and the inactivated superabsorbent polymer from the used absorbent article, and separating the material composed of a thermoplastic resin from the dried residue (hereunder also referred to simply as "thermoplastic resin material separating step"). Secondary sterilization of the residue can be accomplished by drying the residue. The "material composed of a thermoplastic resin" referred to here is a nonwoven fabric or film composed of a thermoplastic resin such as polyethylene, polypropylene or polyester. The separated material composed of a thermoplastic resin may be converted to RPF (conversion to solid fuel). When an oxidizing agent treatment step is not provided, or when an oxidizing agent treatment step is provided but ozone is used as the oxidizing agent, no chlorine-based agents will be present during the RPF conversion step, and therefore high-quality RPF can be produced without damaging the furnace.

When the used absorbent article includes a thermoplastic resin film, the method of the invention may further include a step of drying the residue obtained from separating the pulp fibers and the inactivated superabsorbent polymer from the used absorbent article, and separating the thermoplastic resin film from the dried residue (hereunder also referred to simply as "film separating step"). Secondary sterilization of the residue can be accomplished by drying the residue. The separated thermoplastic resin film may be pelletized for regeneration as a plastic bag or film.

When lime is used for treatment of a used absorbent article, as described in Japanese Unexamined Patent Publication No. 2010-84031, the lime creates an environment with a high pH (12.4) inside the treatment tank, and the cellulose swells causing the pulp fibers to undergo alkali cellulose conversion and degradation, but since the present invention uses an organic acid aqueous solution with a pH of no higher than 2.5 for inactivation of the superabsorbent polymer, the pulp fibers are less likely to undergo degradation, while heating to 80° C. or higher allows virtually all of the microbes to be killed and lowers the adhesive force of the hot-melt adhesive composing the absorbent article, facilitating simple and clean separation and increasing the recovery rate for the pulp fibers. When citric acid is used as the organic acid, the chelating effect and washing power of the citric acid can potentially provide an effect of removing fouling components from excreta. Moreover, if the citric acid concentration is 2 mass % or greater, it is possible to kill *Bacillus subtilis*, which is resistant to killing. By decomposing and removing the inactivated superabsorbent polymer with an oxidizing agent, it is possible to prevent contamination of the recovered pulp fibers or drastic increase in sludge due to water absorption by the superabsorbent polymer. When an oxidizing agent treatment step is not provided, or when an oxidizing agent treatment step is provided but ozone is used as the oxidizing agent, since absolutely no chlorine-based agents are used in the step of recovering the nonwoven fabric and film materials, high-quality RPF can be produced, which is unlikely to damage the combustion furnace. If the film material is separated and recovered, it can be reused as a raw material for a bag or film. Since no salts are used during the treatment steps, there is no residue in the recovered pulp and high quality pulp with a low ash content can be recovered.

According to the method of the invention, degradation of pulp fibers can be minimized even when pulp fibers are regenerated from a used absorbent article, and it is possible to minimize reduction in quality even with repeated regeneration. Increase in the ash content of the pulp fibers and reduction in absorption performance are also less likely to result, compared to the prior art.

Spore forming bacteria (*Bacillus subtilis*, *Bacillus cereus*, etc.) can also be sterilized, and safe pulp fibers with low impurities can be recovered due to a high washing effect and metal ion-removal effect.

The acidic effect of the organic acid accelerates replacement of Na ions in the superabsorbent polymer with H ions, and when the superabsorbent polymer is sodium polyacrylate-based, the sodium polyacrylate is converted to polyacrylic acid, lowering the water-absorbing capacity of the superabsorbent polymer and thereby reducing absorption of the organic acid aqueous solution during washing, to allow treatment to be carried out with a smaller amount of solution. Furthermore, water-absorbing gel becomes smaller, and as a result of screen separation after completion of washing, most of it is discharged along with the pulp fibers out of the treatment tank together with the treatment drainage, and thereafter most of the residue in the tank consists of non-water-absorbing materials such as the nonwoven fabric and film, thus increasing the drying efficiency.

Since the inactivated superabsorbent polymer that has been discharged out of the treatment tank along with the pulp fibers is oxidatively decomposed and reduced in molecular weight by the oxidizing agent, it can be easily treated by ordinary waste water treatment. Decomposition and removal of the inactivated superabsorbent polymer can reduce impurities in the pulp fibers. Moreover, the effect of the oxidizing agent may also be expected to have a secondary sterilizing, bleaching and deodorizing effect on the pulp fibers.

EXAMPLES

The present invention will now be explained in more specific detail through the following examples, with the understanding that the invention is in no way limited to the examples.

Example 1

After immersing 100 g of standard compost (YK-8, product of Yawata Corp.) in 1 L of ion-exchanged water and stirring for 5 minutes, the mixture was allowed to stand for 30 minutes and 240 mL of the supernatant solution was sampled, to prepare artificial sewage. The prepared artificial sewage was subjected to ATP inspection using a Lumitester PD-30 by Kikkoman Corp. as the measuring instrument, resulting in an ATP value of 16126.

After using commercially available paper diapers (Moony$^R$ M size by Unicharm Corp.) to absorb 240 mL of the previously prepared artificial sewage, one of the diapers was loaded into a washing tank of a dual-tank miniature washing machine ("HareBare" AST-01 by Alumis Co.), and then 10 L of an aqueous solution comprising citric acid (product of Fuso Chemical Co., Ltd.) dissolved at a concentration of 2 mass % (pH 2.1) and at a water temperature of 85° C. was loaded in and washing was carried out for 15 minutes, after which a strainer with a hole size of φ10 mm was used to sift out the large-sized solids such as the nonwoven fabric and film that were floating in the liquid inside the washing tank, they were drained, and the pulp fibers and inactivated superabsorbent polymer remaining in the tank, as well as the pulp fibers and inactivated superabsorbent polymer that had been discharged out of the tank together with the drainage, were recovered and subjected to ATP inspection. The results of the ATP inspection yielded an ATP value of 0.

Next, the pulp fibers and inactivated superabsorbent polymer were placed in a nylon net (250 mesh nylon net by NBC Meshtec, Inc.) bag (250 mm×250 mm), and dewatered for 5 minutes in a dewatering tank. The dewatered pulp fibers and inactivated superabsorbent polymer were immersed in a 1 mass % sodium hypochlorite aqueous solution together with the nylon net bag and subjected to stirring and washing for 5 minutes, and after again dewatering for 5 minutes in a dewatering tank, they were dried for 24 hours with a hot air drier at 105° C., and then the pulp fibers were recovered. Upon analyzing the ash content, water absorption factor and water retention factor of the recovered pulp fibers, the ash content was 0.39 mass %, the water absorption factor was 16.4 g/g and the water retention factor was 7.6 g/g.

Comparative Example 1

A test was conducted by the method described in Japanese Unexamined Patent Publication No. 2010-84031. Specifically, after using commercially available paper diapers (Moony$^R$ M size, by Unicharm Corp.) to absorb 240 mL of the previously prepared artificial sewage, one diaper was loaded into a washing tank of a dual-tank miniature washing machine ("HareBare" AST-01 by Alumis Co.), 80 g of CaO (product of Wako Pure Chemical Industries, Ltd.) was further loaded into the washing tank, and then 6.5 L of a sodium hypochlorite aqueous solution at 250 ppm by mass (prepared by dilution of a product purchased from Wako Pure Chemical Industries, Ltd.) was loaded in. After 15 minutes of washing, the paper diaper floating in the liquid inside the washing tank was recovered, and since the diaper had retained its form without separation, the surface material was physically torn by hand to recover the pulp fibers including the inactivated superabsorbent polymer inside the diaper. Upon analyzing the ash content, water absorption factor and water retention factor of the recovered pulp fibers, the ash content was 15.9 mass %, the water absorption factor was 8.0 g/g and the water retention factor was 2.8 g/g.

Example 2

(Verifying Correlation Between Citric Acid Concentration and Residual Na in Superabsorbent Polymer)

After absorbing 200 mL of ion-exchanged water with 5 g of a superabsorbent polymer ("AQUA KEEP" SA60 superabsorbent polymer by Sumitomo Seika Chemicals Co., Ltd., Na concentration: $1.7 \times 10^5$ mg/kg, ion-exchanged water absorption factor: 687-fold) and allowing it to stand for 10 minutes, it was immersed for 10 minutes in citric acid aqueous solutions with different citric acid concentrations at 80° C., and then the superabsorbent polymer was removed out and the residual Na concentration and water absorption factor of the superabsorbent polymer were analyzed. The analysis results are shown in Table 1. With a citric acid concentration of 1 mass % or greater, the residual Na concentration in the superabsorbent polymer could be reduced to approximately $1/100$ or lower, and the water absorption factor (water absorption performance) of the superabsorbent polymer could be reduced to $1/10$ or lower.

TABLE 1

| Citric acid concentration (mass %) | 1 | 3 | 5 | 10 |
|---|---|---|---|---|
| Citric acid aqueous solution pH (20° C.) | 2.3 | 1.8 | 1.5 | 1.3 |
| Residual Na concentration in SAP (mg/kg) | $1.0 \times 10^3$ | $3.1 \times 10^3$ | $5.9 \times 10^2$ | $3.8 \times 10^2$ |
| Water absorption factor of SAP (times) | 12.2 | 5.4 | 5.6 | 5.6 |

Example 3

(Verifying Decomposition of Inactivated Superabsorbent Polymer by Oxidizing Agent)

After placing 10 g of inactivated superabsorbent polymer into a nylon net (250 mesh nylon net by NBC Meshtec, Inc.) bag (250 mm×250 mm), and measuring the total mass of the inactivated superabsorbent polymer and the nylon net bag, they were immersed for 60 minutes in 500 g of a sodium hypochlorite aqueous solution with a sodium hypochlorite concentration of 1 mass % at 80° C. When the total mass of the inactivated superabsorbent polymer and the mesh bag was measured after immersion, the mass was found to be that of the nylon net bag alone. In other words, the inactivated superabsorbent polymer had decomposed, completely eluting from the nylon net.

The methods of analyzing each of the analyzed parameters are as follows.

[Method of Analyzing Pulp Fiber Ash Content]

The ash content is the amount of inorganic substances or nonflammable residue remaining after the organic substances have been ashed. The ash content is measured according to the Sanitary Product Material Standards, "2. General test methods", "5. Ash content test method". Specifically, the ash content is measured in the following manner.

A platinum, quartz or magnetic crucible is strongly preheated at 500 to 550° C. for 1 hour, and after standing to cool, the mass is precisely measured. After taking 2 to 4 g of sample and placing it in the crucible, the mass is precisely measured, removing or displacing the cover of the crucible if necessary, and gentle heating is performed first, followed by gradual increase in the temperature to strong heating at 500 to 550° C. for 4 hours or longer, ashing it until no more carbides remain. After being allowed to cool, the mass is precisely measured. The residue is again ashed until reaching a constant mass, and after cooling, the mass is precisely measured and recorded as the ash content (mass %).

[Method of Analyzing Pulp Fiber Water Absorption Factor]

The water absorption factor is the mass of water absorbed by the pulp fibers per unit mass. The water absorption factor is measured in the following manner.

(1) A bag (200 mm×200 mm) of a nylon net (250 mesh nylon net by NBC Meshtec, Inc.) is prepared, and its mass NO (g) is measured.

(2) Approximately 5 g of measuring sample is placed in the nylon net, and the mass $A_0$ (g) including that of the nylon net bag is measured.

(3) After placing 1 L of 0.9% physiological saline in a beaker, the prepared sample-containing nylon net bag is immersed therein and allowed to stand for 3 minutes.

(4) The bag is raised out and allowed to stand for 3 minutes on a draining net for drainage.

(5) The mass A (g) after drainage of the nylon net bag containing the sample is measured.

(6) Another set of nylon nets cut out to the same size is prepared, (3) and (4) are carried out in the same manner but without placing the sample in them, and the mass N (g) of the nylon net bags alone after drainage is measured.

(7) The water absorption factor (times) is calculated by the following formula.

$$\text{Water absorption factor} = (A - N - (A_0 - N_0))/(A_0 - N_0)$$

(8) The measurement is conducted 10 times, and the average value of the 10 measurements is recorded.

[Method of Analyzing Pulp Fiber Water Retention Factor]

(9) After completing the measurement of (5) in "Method of analyzing pulp fiber water absorption factor", it was dewatered at 150 G for 90 seconds and the mass D (g) was measured.

(10) Another set of nylon nets cut out to the same size is prepared, (3), (4) and (9) are carried out in the same manner but without placing the sample in them, and the mass N' (g) of the nylon net bags alone after drainage is measured.

(11) The water retention factor (times) is calculated by the following formula.

$$\text{Water retention factor} = (D - N' - (A_0 - N_0))/(A_0 - N_0)$$

[Method of Analyzing Residual Na Concentration of Superabsorbent Polymer]

Fluorescent X-ray analysis was used to measure the Na concentration per dry mass of the superabsorbent polymer.

[Method of Analyzing Water Absorption Factor of Superabsorbent Polymer]

The superabsorbent polymer treated with different citric acid concentrations in Example 2 is placed in a nylon net (250 mesh nylon net, product of NBC Meshtec, Inc.) bag (200 mm×200 mm) of previously measured mass $N'_0$ and allowed to stand for 3 minutes for drainage. The mass A' (g) after drainage of the nylon net bag containing the sample is measured. The water absorption factor (times) is calculated by the following formula.

$$\text{Water absorption factor} = (A'_0 - N'_0 - (5))/(5)$$

The measurement is conducted 3 times, and the average value of the 3 measurements is recorded.

INDUSTRIAL APPLICABILITY

The method of the invention can be suitably utilized for recovering pulp fibers from a used absorbent article that contains pulp fibers and a superabsorbent polymer.

The invention claimed is:

1. A method of recovering pulp fibers from a used absorbent article containing pulp fibers and a superabsorbent polymer, said method comprising:

treating the used absorbent article in its original state at a temperature of 80° C. or higher with an organic acid aqueous solution having a pH of no higher than 2.5 and excluding ozone, to inactivate the superabsorbent polymer;

separating the pulp fibers and the inactivated superabsorbent polymer from the used absorbent article that has been treated with the organic acid aqueous solution; and then treating a mixture comprising the separated pulp fibers and inactivated superabsorbent polymer with an oxidizing agent to decompose, reduce in molecular weight and solubilize the inactivated superabsorbent polymer, wherein the oxidizing agent is selected from the group consisting of chlorine dioxide, ozone and sodium hypochlorite.

2. The method according to claim 1, further comprising: separating the pulp fibers from the mixture that has been treated with the oxidizing agent.

3. The method according to claim 1, wherein an organic acid contained in the organic acid aqueous solution is citric acid.

4. The method according to claim 3, wherein a citric acid concentration in the organic acid aqueous solution is 2 mass % or greater.

5. The method according to claim 1, wherein
the used absorbent article includes a material composed of a thermoplastic resin, and
the method further comprises:
drying a residue obtained from said separating the pulp fibers and the inactivated superabsorbent polymer from the used absorbent article; and
separating the material composed of the thermoplastic resin from the dried residue.

6. The method according to claim 1, wherein
the used absorbent article includes a thermoplastic resin film, and
the method further comprises:
drying a residue obtained from said separating the pulp fibers and the inactivated superabsorbent polymer from the used absorbent article; and
separating the thermoplastic resin film from the dried residue.

7. The method according to claim 1, wherein the used absorbent article is at least one type selected from the group consisting of paper diapers, urine-absorbing pads, bed sheets, sanitary napkins and pet sheets.

* * * * *